July 3, 1951  D. M. MOORE  2,559,222
PERSPECTIVE DRAFTING MACHINE
Filed April 23, 1948  3 Sheets-Sheet 1

INVENTOR
DONOVAN M. MOORE

July 3, 1951 D. M. MOORE 2,559,222
PERSPECTIVE DRAFTING MACHINE
Filed April 23, 1948 3 Sheets-Sheet 2

INVENTOR
DONOVAN M. MOORE
By Young, Emery & Thompson
Attys.

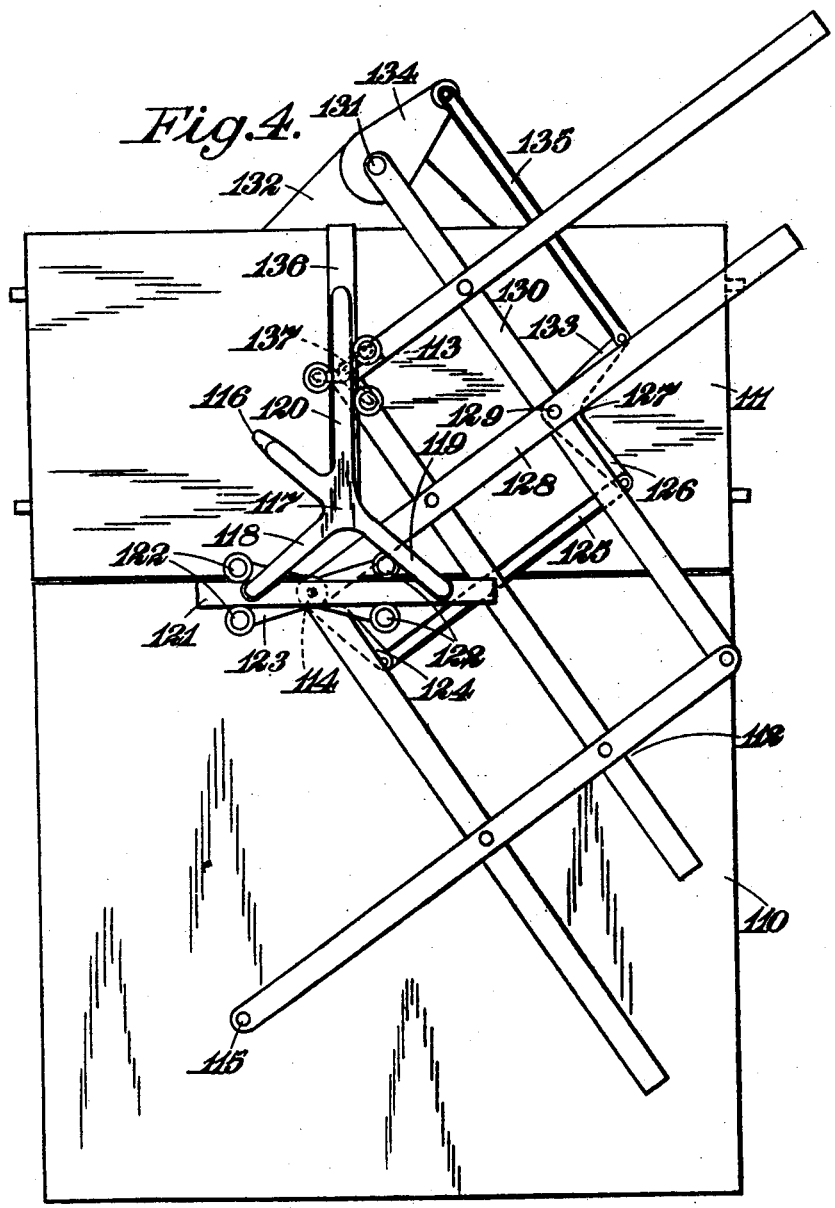

Patented July 3, 1951

2,559,222

UNITED STATES PATENT OFFICE 2,559,222

PERSPECTIVE DRAFTING MACHINE

Donovan Mark Moore, Bristol, England, assignor to Isometric Projections Limited (formerly Perspector Limited), Bristol, England, a British company Application April 23, 1948, Serial No. 22,744
In Great Britain June 2, 1947

11 Claims. (Cl. 33—18)

This invention relates to drawing appliances and has for its object to provide an improved appliance for making parallel perspective drawings from a plan or normal view.

According to this invention a drawing appliance comprises a tracing point, a drawing point, one linkage adapted to reproduce the movement of the tracing point to a proportionally changed scale, means constraining the drawing point to follow said reproduced movement in one direction only, a second linkage adapted to reproduce the movement of the tracing point to a different scale from that of the first linkage and means constraining the drawing point to follow the reproduced movement of said second linkage in a direction normal to the first direction.

Means may be provided for adjusting the scale of reproduction of one or both of said linkages.

Said one linkage and said second linkage may each be pantographs having in common two pivotally connected arms, one of which carries the tracing point and the other of which is pivoted to the board over which the drawing and tracing points are movable.

Said drawing point may be mounted on a member constrained to move over the drawing without rotation and having two slides at right angles to one another, and an element of said one linkage, which is adapted to reproduce the movement of the tracing point, be arranged to slide in one of the slides and an element of said second linkage, which is adapted to reproduce the movement of the tracing point to different scale, be arranged to slide in the other of the slides.

Alternatively, said drawing point may be mounted on a member constrained to move over the drawing without rotation and carrying two linkages each carrying an element constrained to move in a straight line relative to said member, the directions of the two straight lines being at right angles and one of the elements be connected to said linkage so as to reproduce the movement of the tracing point to a proportionally changed scale and the other of the elements be connected to said second linkage so as to reproduce the movement of the tracing point to a different scale.

The means constraining said member to move over the drawing without rotation may comprise a link constrained by levers pivoted to the drawing board to move parallel to itself and carrying said member by a pair of links forming another parallel movement linkage.

In another arrangement a drawing point may be carried on a member which has two slide bars at right angles to each other which bars are slidably carried in mountings on said first and second linkages respectively and means are provided for constraining one of said mountings so that it is movable over the drawing board without rotation relative thereto.

In all these arrangements the drawing board may be slidably mounted whereby its position relative to the drawing point may be adjusted in that one of said directions having the smaller scale of reproduction.

The invention will now be described with reference to the accompanying drawings in which:

Figure 4 shows yet a further form of the invention.

Figure 1:
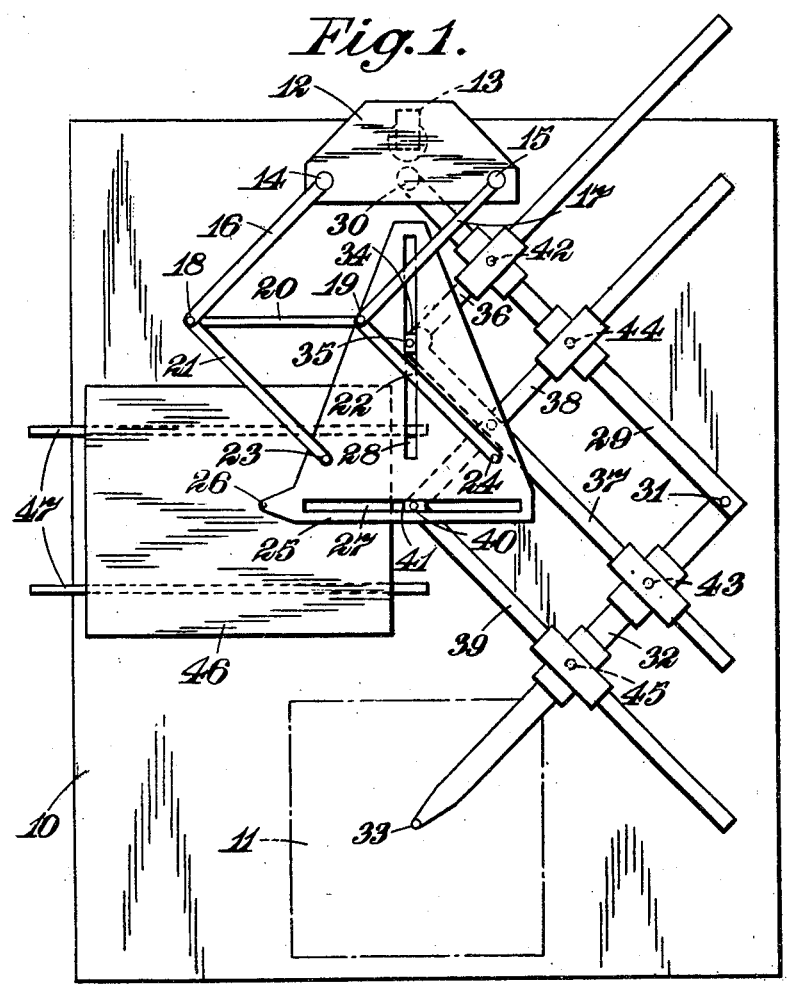
Figure 1 shows one arrangement of the invention.

Referring to Figure 1 there is shown a drawing board 10 on which is fixed the drawing 11 of the object of which the perspective view is required. A mounting 12 which is fixed to the board 10 by means of a clamp 13 is provided with two pivots 14 and 15 on which are carried respectively the ends of two parallel arms 16 and 17 of equal length. The other ends of these two arms have pivots 18 and 19 which are joined by a link 20 which keeps the arms parallel to one another and this link is constrained to move in an arc whilst remaining parallel to itself. The pivots 18 and 19 also carry respectively one end of each of a second pair of parallel arms 21 and 22 of equal length, the other ends of these arms being pivotally connected at 23 and 24 to a member 25 which is thus free to move over the drawing board 10 but is unable to rotate relative thereto.

The member 25 carries a drawing point 26 and is provided with a pair of guideways 27 and 28 at right angles to one another. One end of an arm 29 of a pantograph is pivoted at 30 to the mounting 12 and the other end 31 of this major arm is pivotally connected to the tracing arm 32 which carries a tracing point 33. Movement of the tracing point is reproduced to a reduced scale in the well-known manner by an element 34 mounted on the pivot 35 of a pair of secondary arms 36 and 37 of the pantograph which are pivotally connected to the major arm 29 and to the tracing arm 32 respectively. The element 34 is slidably mounted in the guideway 28 of the member 25 so that movement of the element in a direction along the slide does not move the member 25 but any movement at right angles to that direction is followed by the member.

Another pair of secondary arms 38 and 39 are also carried respectively by the major arm 29 and the tracing arm 32 and are pivoted together at 40 to an element 41 which will thus also reproduce the movement of the tracing point 33 in the known manner. The element 41 is slidably mounted in the guideway 27 of the member 25 so that the latter follows only the movement of element 41 in a direction at right angles to the guideway 27.

The positions of the pivoting points 42, 43, 44 and 45 of the secondary arms 36, 37, 38 and 39 respectively with major arm and tracing arm may be adjusted by providing a pair of sleeves at each pivoting point, pivotally connected by the pivoting point, with one sleeve adjustably slidably mounted on one arm and the other sleeve adjustably slidably mounted on the other arm, as shown in the patent to Braastad, Serial Number 265,744, issued October 10, 1882 or in the French patent to Leger, Serial Number 538,602, published June 13, 1922, so that the scales to which the elements 34 and 41 reproduce the movements of the tracing point 33 may be independently varied.

In the example shown, each of the elements reproduces the movement of the tracing point to a reduced scale, the scale of reproduction by element 34 being smaller than that of element 41. It will be seen that only the components of the movement of each element in a direction transverse to that of the guideway in which the element is mounted is transmitted to the drawing point 26. Thus if the tracing point 33 follows a plan or normal view drawing, then the drawing point 26 will reproduce a figure with the scale in one direction different from the scale in a direction at right angles to said one direction as is required in producing parallel perspective drawings.

In order to produce a parallel perspective drawing of an object, it is necessary to copy the various features of the object shown in one view, for example the plan, and to reproduce these various features in the perspective view displaced according to their position along an axis normal to the plan. The positions of these features along the normal to the plan are shown by a view in elevation and from this view the various displacements in the perspective drawing are readily calculated. In order to facilitate the making of these displacements, it is preferred that the perspective drawing being produced should be slidably mounted on the main drawing board. It will be appreciated that the required direction of displacement of the drawing is the direction of the smaller scale of reproduction. Thus as is shown in Figure 1, the drawing point 26 is arranged to move over a board 46 mounted on a pair of parallel slide rails 47 which are fixed to the main drawing board 10 and lie parallel to the guideway 27.

Figure 2:
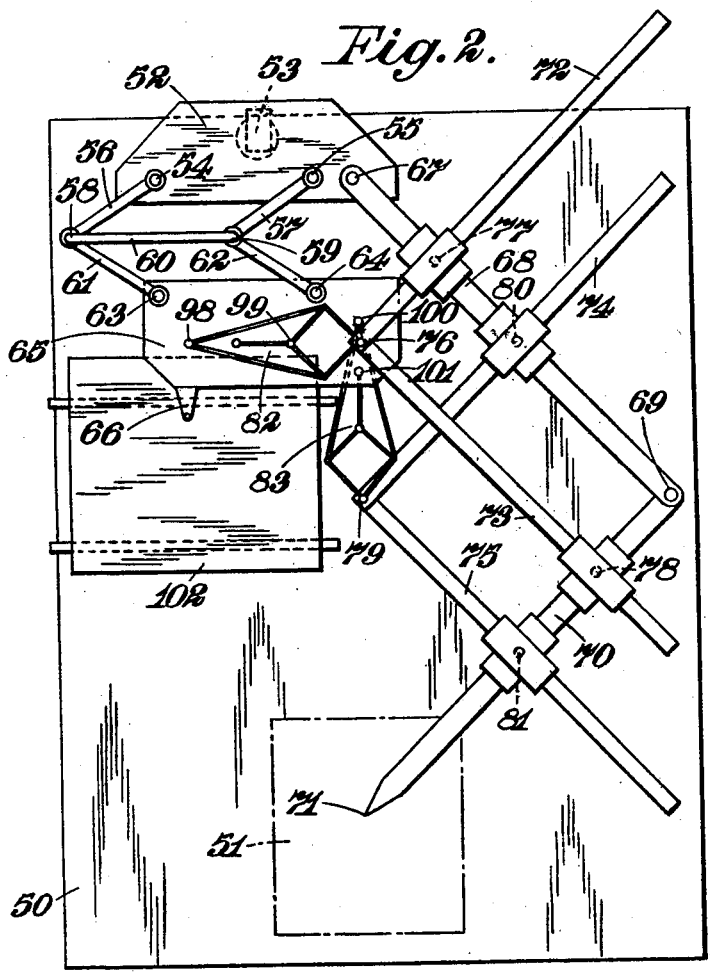
Figure 2 shows a modified form of the arrangement shown in Figure 1.

There is shown in Figure 2 a modified form of the drawing appliance in which, as in Figure 1, the main drawing board 50 carrying a drawing 51 has a mounting 52 fixed to it by a clamp 53. One end of each of two parallel arms 56 and 57 of equal length are attached to the mounting by pivots 54 and 55 respectively and the other ends of these two arms are provided with pivots 58 and 59 which each carry one end of a link 60 which link serves to keep the arms 56 and 57 parallel to one another. The pivots 58 and 59 also carry respectively one end of each of the parallel arms 61 and 62, the other ends of which are pivoted to the member 65 which carries the drawing point 66. As was the member 26 in the previously described arrangement, the member 65 is free to move over the drawing board but is prevented from rotating relative thereto by the linkage attaching to the mounting 52.

Attached to the mounting 52 by a pivot 67 is one end of the major arm 68 of a pantograph, the other end of which arm is connected by a pivot 69 to the tracing arm 70 which carries a tracing point 71. The pantograph has two pairs of secondary arms 72, 73 and 74, 75. The arms 72, 73 are joined by a pivot 76 and are carried on the major arm 68 and the tracing arm 70 respectively by pivots 77 and 78 the position of which on the arms is adjustable to vary the scale with which the pivot 76 reproduces the movement of the tracing point 71. The other pair of secondary arms 74 and 75 are joined by a pivot 79 and are carried on the major arm 68 and the tracing arm 70 respectively by pivots 80 and 81 the position of which on the arms is adjustable to vary the scale with which the pivot 79 reproduces the movement of the tracing point 71.

Figure 3:
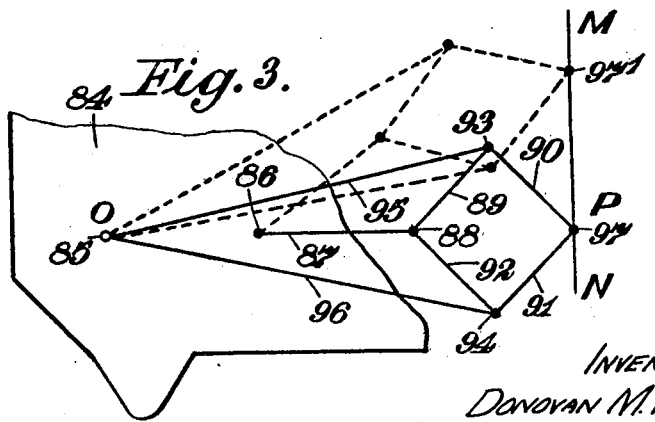
Figure 3 is a diagram explaining the operation of one of the linkages used in the arrangement shown in Figure 2.

The arrangement shown in Figure 2 differs from that of Figure 1 in that the pivots 76 and 79 are attached to the member 65 which carries the drawing point 66 by linkages 82 and 83 respectively. These two linkages are similar although disposed at right angles to one another in the plane of the board 50 and a similar linkage is shown to a larger scale in Figure 3 in which 84 represents a part of the member 65 having two pivots 85 and 86. To the pivot 86 is attached a member 87 of length equal to the spacing between the pivots 85 and 86, the other end of this arm being pivotally connected to one corner of a rhombus formed from four arms 89, 90, 91 and 92 of equal length pivoted to one another at their ends. To the two corners 93 and 94 of the rhombus which are adjacent to pivot 88 are attached to the ends of links 95 and 96 respectively and the other of both these links are attached to the pivot 85. This linkage has the property that the fourth corner 97 is constrained to move along a straight line at right angles to the line joining the pivots 85 and 86 i. e. along the line MN of Figure 3. Thus when the linkage is displaced as is shown by the dotted lines, the corner 97 is moved to the position 97′.

It will be readily apparent that this linkage can be used in place of a guideway such as 27 or 28 in Figure 1 for making the drawing point reproduce in one direction only the motion of the reproducing element of the pantograph. Referring to Figure 2, the pivot 76 of one pair of secondary arms of the pantograph is attached to the fourth corner of the rhombus of linkage 82 so that the member 65 follows the movement of the pivot 76 in the direction of the line joining the pivots 98, 99 by which the linkage 82 is attached to the member 65. The linkage 83 is attached to the member 65 by pivots 100, 101 which are situated on a line at right angles to the line joining pivots 98, 99 and the fourth corner of the rhombus of linkage 83 is attached to the pivot 79 of the second pair of secondary arms 74 and 75 of the pantograph. Only the component of the motion of pivot 79 in a direction along the line joining pivots 100, 101 is therefore transmitted to the drawing point 66.

The operation of the appliance shown in Figure 2 is similar to that of the previously described arrangement; the pivots 78 and 79 reproduce the motion of the tracing point 71 to different scales and the component in one direction of the motion of pivot 76 is transmitted by linkage 82 to the drawing point 66 whilst the component at right angles to that direction of the motion of pivot 79 is transmitted by the linkage 83 to the drawing point. Thus the drawing point reproduces the figure followed by the tracing point but with the scale in one direction different from the scale at right angles to that direction. As before, the drawing point 66 is arranged to move over a board 102 which is slidably mounted by means of guide rails on the board 50 so that the drawing being reproduced may be moved relative to the drawing being copied in the direction of the smaller scale of reproduction.

Figure 4 illustrates another embodiment of the invention which includes a fixed board 110 on which is slidably mounted a second board 111. As in the previously described modifications a double pantograph linkage 112 is mounted on the fixed board 110 and has two pivots 113 and 114 which reproduce to different scales the movements of the tracing point 115. The drawing point 116, which moves over the board 111, is carried on a spider 117 having three arms 118, 119 and 120. Two of these arms 118 and 119 are, at their ends secured to a track 121 which can slide longitudinally between the four wheels 122 of a carriage 123. This carriage is fixed to the pivot 114 so that it moves therewith. The pivot 114 is however prevented from rotating by being fixed to one end of the crank arm 124. The other end of this arm is pivoted to one end of a link 125, the other end of which is carried by a pivot on one arm 126 of bell crank lever 127. The distance between pivots on the link 125 is made equal to the distance along the pantograph arm 128 from the pivot 114 to a pivot 129 connecting the arm 128 to the major arm 130 which is pivoted at 131 to a mounting 132 on the board 110.

The lengths of the crank arm 124 and the arm 126 of the bell crank lever 127 are made equal so that the elements 124, 125, 126 and 128 form a parallel motion linkage. The arm 124 to which is fixed the pivot 114, therefore always remains parallel to the arm 126. The other arm 133 of the bell crank lever 127 is maintained parallel to a fixed link 134 by means of a second parallel motion linkage comprising the arm 130 between the pivots 129 and 131, the arm 133, the link 134 and another link 135. The link 134 is fixed to the mounting 132 and therefore the bell crank lever 127 and hence also the crank arm 124 are maintained in a fixed angular relationship with the board 110 despite their movement as the tracing point 115 moves over a drawing. By this means, the carriage 123 is maintained in a fixed angular relationship and the drawing point 116 will follow the movements of the pivot 114 in a fixed direction which is perpendicular to the direction of the track 121. The link 134 may be made adjustable in its angular position about the pivot 131 in order to adjust the track 121 to the required direction.

The third arm 120 of the spider 117 is fixed to a track 136 at right angles to the track 121 and slidably mounted in a carriage 137 which is rotatably mounted on the pivot 113. Since the track 136 is fixed to the spider 117 it remains at right angles to the track 121 and hence in a fixed angular relationship to the board 110. The drawing point 116 therefore follows the movement of the pivot 113 in one direction only at right angles to the track 137.

The operation of this machine shown in Figure 4 is similar to that of the previously described arrangements; the pivots 113 and 114 reproduce the motion of the tracing point 115 to different scales and the component in one direction of the motion of pivot 113 is transmitted to the drawing point 116 whilst the component at right angles to that direction of the motion of pivot 114 is also transmitted to the drawing point. Thus the drawing point reproduces the figure followed by the tracing point but with the scale in one direction different from the scale at right angles to that direction. As before, the drawing point 116 is arranged to move over a board 111 which is slidably mounted on board 110 so that the drawing being reproduced may be moved relative to the drawing being copied in the direction of the smaller scale of reproduction.

Many perspective drawings have to be produced in which the direction of viewing is at 45° to the planes of the plan, elevation and side view, e. g., looking along the diagonal of a cube and for this purpose, it may be preferable to use a machine in which the pantograph arms are permanently set to give the required ratio of scales of reproduction, i. e. 0.577 to 1. It will be appreciated that if this ratio is fixed, the pantograph arms need not extend beyond the pivots.

I claim:

1. A drawing appliance comprising a drawing surface, a tracing point movable over said drawing surface, a first parallelogram-type pantograph, having a pivotally connected pair of major arms, one of which carries said tracing point and another of which is pivotally mounted on said drawing surface, said pantograph having a pivotally connected pair of secondary arms, an element carried by the pivotal connection of the secondary arms for reproducing the movement of the tracing point to a proportionally changed scale, a drawing point, means constraining the drawing point to follow the movement of said element in one direction only, a second parallelogram-type pantograph having major arms common with the major arms of the first pantograph and a pivotally connected pair of secondary arms, said second pantograph having an element carried by the pivotal connection of the secondary arms thereof for reproducing the movement of the tracing point to a different scale from that produced by the element of said first pantograph, and means constraining the drawing point to follow the movement of the element of the second pantograph in a direction normal to the direction produced by the element of the first pantograph.

2. A drawing appliance comprising a drawing surface, a tracing point movable over said drawing surface, a first parallelogram-type pantograph having a pivotally connected pair of major arms, one of which carries said tracing point and another of which is pivotally mounted on said drawing surface, said pantograph having a pivotally connected pair of secondary arms, adjustably pivotally connected to the pair of major arms for adjustment of points of pivotal connection of the secondary arms to the major arms along the length of said arms, an element carried by the pivotal connection between the secondary arm for reproducing the movement of the tracing point to a scale proportionally changed in accordance with the adjustment of the points of pivotal connection between the secondary and major arms, a drawing point, means constraining the drawing point to follow the movement of said element in one direction only, a second parallelogram-type pantograph having major arms common with the major arms of the first pantograph and a pivotally connected pair of secondary arms similarly adjustably pivotally connected to the pair of major arms, said second pantograph having an element carried by the pivotal connection of the secondary arms thereof for reproducing the movement of the tracing point to a different scale from that produced by the element of said first pantograph which different scale is variable in accordance with the adjustment of the points of pivotal connection between the major and secondary arms of said second pantograph, and means constraining the drawing point to follow the movement of the element of the second pantograph in a direction normal to the direction produced by the element of the first pantograph.

3. A drawing appliance comprising a drawing board, a tracing point movable over said drawing board, two parallelogram-type pantographs having in common two pivotally connected arms, one of which arms carries said tracing point and the other of which arms is pivotally mounted on said drawing board, which pantographs each have an element whose movement reproduces the movement of the tracing point to a proportionally changed scale, the movements of two elements being to different scales, a drawing point, and means constraining the drawing point to follow the movement of one element in one direction only and to follow the movement of the other element in a direction normal to said one direction.

4. A drawing appliance comprising a drawing surface, a tracing point movable over said drawing surface, a first parallelogram-type pantograph, having a pivotally connected pair of major arms, one of which carries said tracing point and another of which is pivotally mounted on said drawing surface, said pantograph having a pivotally connected pair of secondary arms, an element carried by the pivotal connection of the secondary arms for reproducing the movement of the tracing point to a proportionally changed scale, a second parallelogram-type pantograph having major arms common with the major arms of the first pantograph and a pivotally connected pair of secondary arms, said second pantograph having an element carried by the pivotal connection of the secondary arms thereof for reproducing the movement of the tracing point to a different scale from that produced by the element of said first pantograph, a drawing point, a member carrying said drawing point, means for constraining the movement of said member in a plane parallel to the plane of the drawing surface without rotation relative to said surface, said member having two guideways at right angles to one another in the plane of movement, and means associated with each of the elements of the two said pantographs whereby each of said elements are guided in one of said guideways respectively.

5. A drawing appliance comprising a drawing surface, a tracing point movable over said drawing surface, a first parallelogram-type pantograph, having a pivotally connected pair of major arms, one of which carries said tracing point and another of which is pivotally mounted on said drawing surface, said pantograph having a pivotally connected pair of secondary arms, an element carried by the pivotal connection of the secondary arms for reproducing the movement of the tracing point to a proportionally changed scale, a second parallelogram-type pantograph having major arms common with the major arms of the first pantograph and a pivotally connected pair of secondary arms, said second pantograph having an element carried by the pivotal connection of the secondary arms thereof for reproducing the movement of the tracing point to a different scale from that produced by the element of said first pantograph, a drawing point, a member carrying said drawing point, means for constraining the movement of said member in a plane parallel to the plane of the drawing surface without rotation relative to said surface, a first linkage connected between the element of the first pantograph and said member for constraining said member to follow in one direction only the movements of the said element, and a second linkage connected between the element of the second pantograph and said member for constraining said member to follow in a direction at right angles to the direction produced by the first linkage the movement of the element of said second pantograph.

6. A drawing appliance comprising a drawing surface, a tracing point movable over said drawing surface, a first parallelogram-type pantograph, having a pivotally connected pair of major arms, one of which carries said tracing point and another of which is pivotally mounted on said drawing surface, said pantograph having a pivotally connected pair of secondary arms, an element carried by the pivotal connection of the secondary arms for reproducing the movement of the tracing point to a proportionally changed scale, a second parallelogram-type pantograph having major arms common with the major arms of the first pantograph and a pivotally connected pair of secondary arms, said second pantograph having an element carried by the pivotal connection of the secondary arms thereof for reproducing the movement of the tracing point to a different scale from that produced by the element of said first pantograph, a pair of parallel levers each pivoted to said drawing surface, an arm pivoted to both of said levers so as to be constrained to remain parallel to itself, when moved, a second pair of parallel levers pivotally connected to said arm and said first pair of parallel levers, a member pivotally connected to said second pair of parallel levers, said member constrained by said second pair of parallel levers to be movable without rotation relative to said arm, means constraining said member to follow in one direction only the movements of the element of the first pantograph, means constraining said member to follow in a direction at right angles to said direction of movement of element of said first pantograph the movements of the element of said second pantograph, and a drawing point mounted on said member.

7. A drawing appliance comprising a drawing surface, a tracing point movable over said drawing surface, a first parallelogram-type pantograph, having a pivotally connected pair of major arms, one of which carries said tracing point and another of which is pivotally mounted on said drawing surface, said pantograph having a pivotally connected pair of secondary arms, an element carried by the pivotal connection of the secondary arms for reproducing the movement of the tracing point to a proportionally changed scale, a second parallelogram-type pantograph having major arms common with the major arms of the first pantograph and a pivotally connected pair of secondary arms, said second pantograph having an element carried by the pivotal connection of the secondary arms thereof for reproducing the movement of the tracing point to a different scale from that produced by the element of said first pantograph, a drawing point, a member carrying said drawing point, means for constraining the movement of said member in a plane parallel to the plane of said drawing surface without rotation relative to said surface, means constraining said member to follow in one direction only the movements of the element of the first said pantograph, means constraining said member to follow in a direction at right angles to said direction produced by the element of the first said pantograph the element of the second said pantograph, a second drawing surface arranged to cooperate with said drawing point, and guideways on said first drawing surface on which said second drawing surface may be moved relative to said first drawing surface in one of the said directions.

8. A drawing appliance comprising a drawing surface, a tracing point movable over said drawing surface, a first parallelogram-type pantograph, having a pivotally connected pair of major arms, one of which carries said tracing point and another of which is pivotally mounted on said drawing surface, said pantograph having a pivotally connected pair of secondary arms, an element carried by the pivotal connection of the secondary arms for reproducing the movement of the tracing point to a proportionally changed scale, a second drawing surface, a drawing point movable over the second drawing surface, means constraining the drawing point to follow the reproduced movement of the element of the first pantograph in one direction only, a second parallelogram-type pantograph having major arms common with the major arms of the first pantograph and a pivotally connected pair of secondary arms, said second pantograph having an element carried by the pivotal connection of the secondary arms thereof for reproducing the movement of the tracing point to a different scale from that produced by the element of said first pantograph, means constraining the drawing point to follow the movement of the element of the second pantograph in a direction normal to the direction produced by the element of the first pantograph, and guideways on the first drawing surface on which said second drawing surface may be moved relative to said first drawing surface in a direction parallel to that which the element of the said second pantograph moves the drawing point.

9. A drawing appliance comprising a drawing surface, a tracing point movable over said drawing surface, a first parallelogram-type pantograph having a pivotally connected pair of major arms, one of which carries said tracing point and another of which is pivotally mounted on said drawing surface, said pantograph having a pivotally connected pair of secondary arms, adjustably pivotally connected to the pair of major arms for adjustment of points of pivotal connection of the secondary arms to the major arms along the lengths of said major arms, an element carried by the pivotal connection between the secondary arms for reproducing the movement of the tracing point to a scale proportionally changed in accordance with the adjustment of the points of pivotal connection between the secondary and major arms, a second drawing surface, a drawing point movable on the second drawing surface, means constraining the drawing point to follow the reproduced movement of the element of the first pantograph in one direction only, a second parallelogram-type pantograph having major arms common with the major arms of the first pantograph and a pivotally connected pair of secondary arms similarly adjustably pivotally connected to the pair of major arms, said second pantograph having an element carried by the pivotal connection of the secondary arms thereof for reproducing the movement of the tracing point to a different scale from that produced by the element of said first pantograph which different scale is variable in accordance with the adjustment of the points of pivotal connection between the major and secondary arms of said second pantograph, means constraining the drawing point to follow the reproduced movement of the element of said second pantograph in a direction normal to the direction produced by the element of said first pantograph, and guideways on said first drawing surface on which said second drawing surface may be moved relative to said first drawing surface in a direction parallel to that which the element of the said second pantograph moves the drawing point.

10. A drawing appliance comprising a drawing surface, a tracing point movable over said drawing surface, a first parallelogram-type pantograph, having a pivotally connected pair of major arms, one of which carries said tracing point and another of which is pivotally mounted on said drawing surface, said pantograph having a pivotally connected pair of secondary arms, an element carried by the pivotal connection of the secondary arms for reproducing the movement of the tracing point to a proportionally changed scale, a second parallelogram-type pantograph having major arms common with the major arms of the first pantograph and a pivotally connected pair of secondary arms, said second pantograph having an element carried by the pivotal connection of the secondary arms thereof for reproducing the movement of the tracing point to a different scale from that produced by the element of said first pantograph, a drawing point, a member carrying said drawing point, said member having two slide bars at right angles to each other, first and second carriages carried by the elements of the first and second pantographs respectively, the two slide bars of the member being slidably carried in said first and second carriages respectively, and a parallel movement linkage connected to said drawing surface, said pantographs, and said member to maintain said carriages in a predetermined angular relation with the drawing surface.

11. A drawing appliance comprising a drawing surface, a tracing point movable over said drawing surface, a first parallelogram-type pantograph, having a pivotally connected pair of major arms, one of which carries said tracing point and another of which is pivotally mounted on said drawing surface, said pantograph having a pivotally connected pair of secondary arms, an element carried by the pivotal connection of the secondary arms for reproducing the movement of the tracing point to a proportionally changed scale, a second parallelogram-type pantograph having major arms common with the major arms of the first pantograph and a pivotally connected pair of secondary arms, said second pantograph having an element carried by the pivotal connection of the secondary arms thereof for reproducing the movement of the tracing point to a different scale from that produced by the element of said first pantograph, first and second carriages, one on each of said elements, a member having two slide bars at right angles to each other, which bars respectively are slidably carried in said first and second carriages, a drawing point carried by said member, a first parallel movement linkage comprising four pivotally connected links of which the first link consists of that part of the one of the major arms of the pantographs pivotally mounted on the drawing surface between the pivot connecting said arm to said drawing surface and a pivot connecting said arm to one of the secondary arms which carries the element which carries said first carriage, the second link comprises a link fixed to the drawing surface in a predetermined angular relation to said drawing surface and the third and fourth links are equal in length to and parallel to the first and second links respectively, a second parallel movement linkage comprising four pivotally connected link elements of which one link element is formed by said pantograph arm carrying said first carriage, a second link element is fixed to said fourth link of said first parallel movement linkage and the third and fourth link elements are equal in length and parallel to the first and second link elements respectively, and means securing said fourth link element to said first carriage so as to restrain said first carriage from angular rotation with respect to the drawing surface.

DONOVAN MARK MOORE.

REFERENCES CITED

The following references are of record in the file of this patent:

UNITED STATES PATENTS

| Number | Name | Date |
|---|---|---|
| 637,263 | Jacobs | Nov. 21, 1899 |
| 759,566 | Stout | May 10, 1904 |
| 1,166,827 | Fenske | Jan. 4, 1916 |
| 2,021,931 | Bockius | Nov. 26, 1935 |

FOREIGN PATENTS

| Number | Country | Date |
|---|---|---|
| 4,907 | Great Britain | A. D. 1907 |